Sept. 13, 1938.   H. B. ADAMS   2,130,113
APPARATUS FOR DELIVERING EDIBLE SOLIDS TO ICE CREAM
Filed Feb. 4, 1936   3 Sheets-Sheet 1
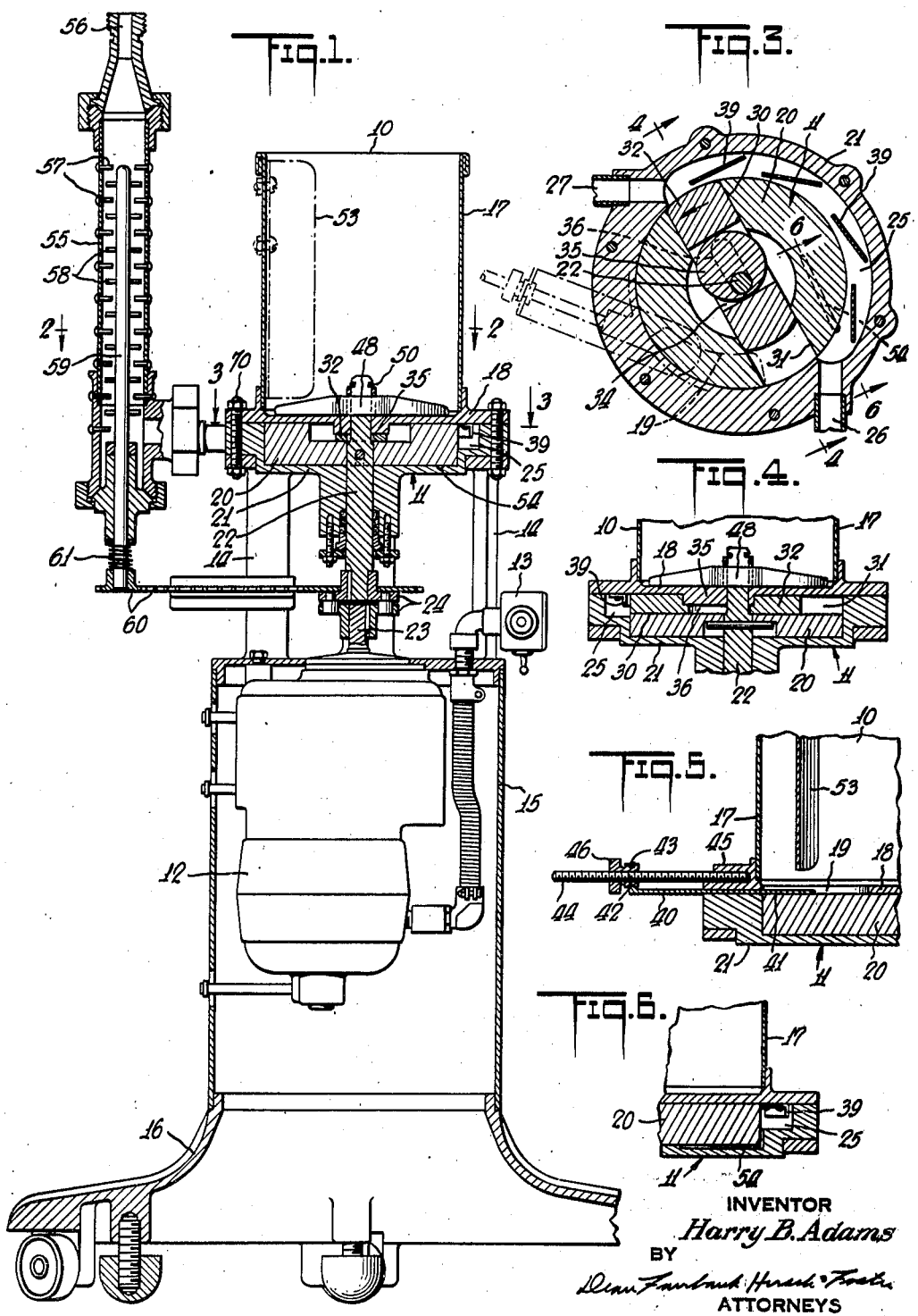
INVENTOR
*Harry B. Adams*
BY
*Dean Fairbank Hirsch & Foster*
ATTORNEYS

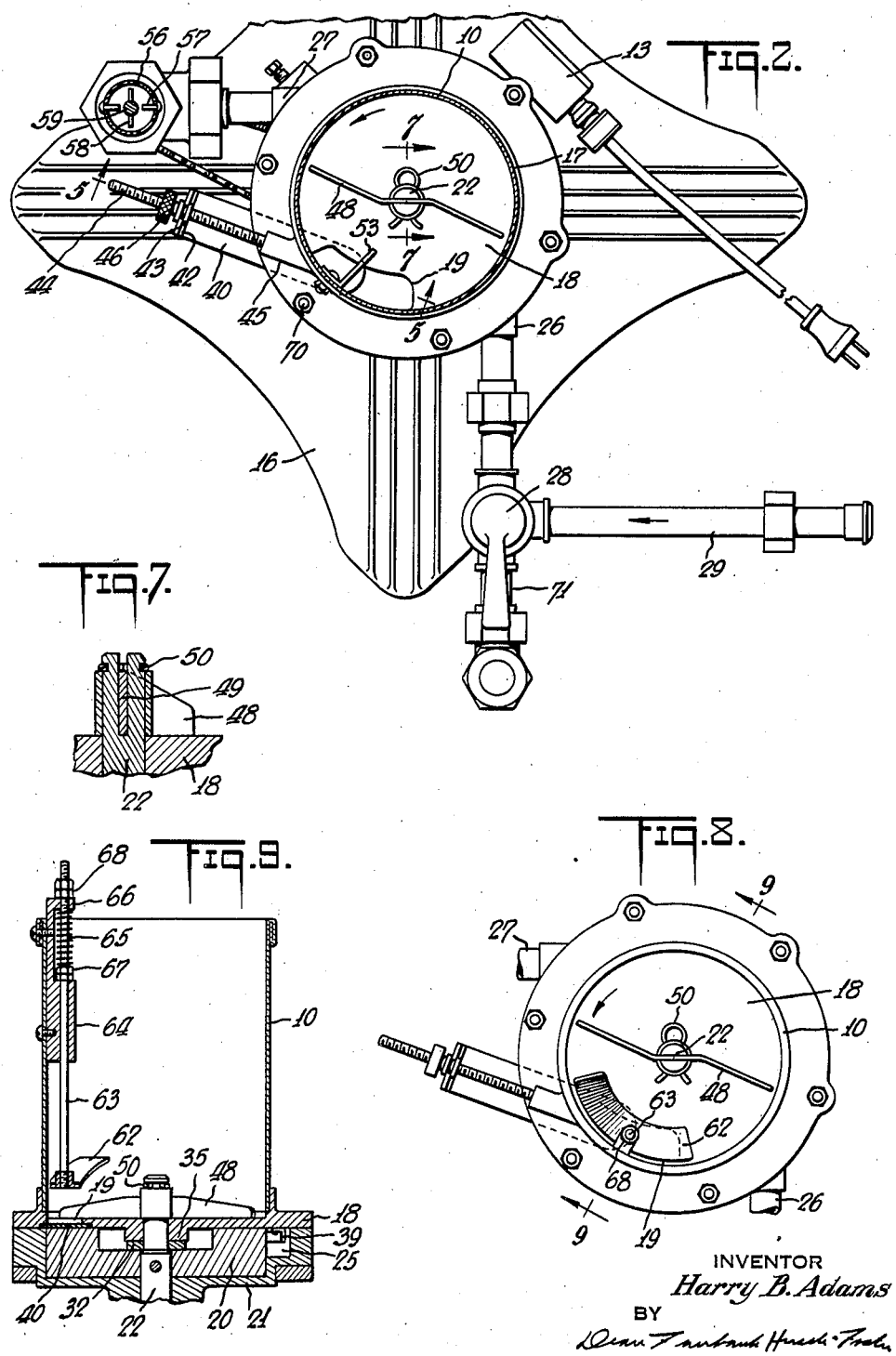

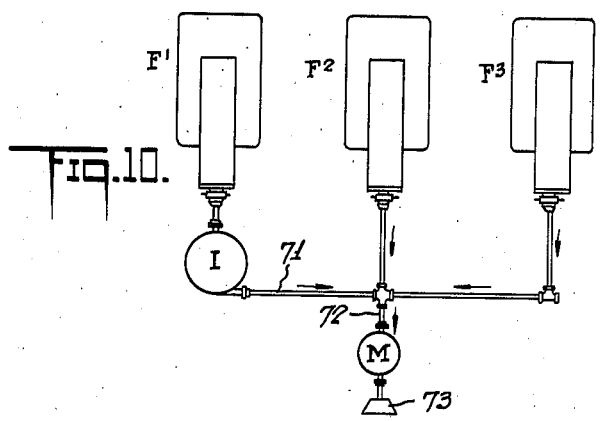
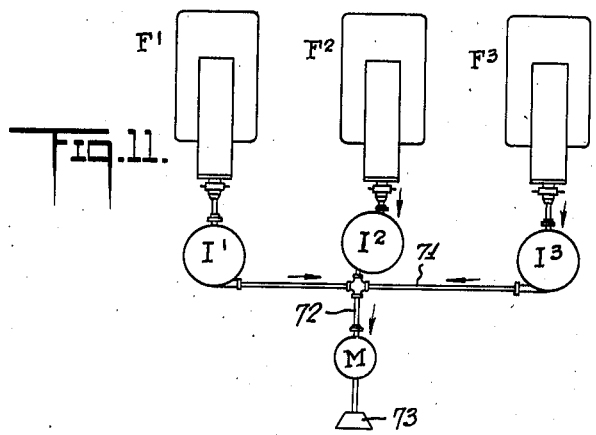
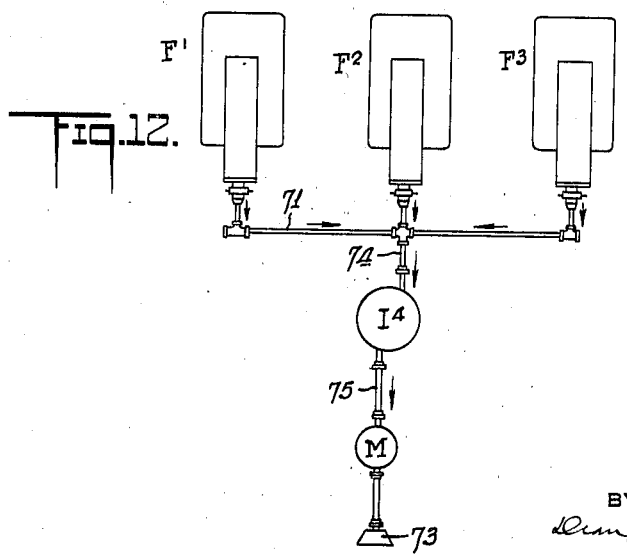

Patented Sept. 13, 1938

2,130,113

UNITED STATES PATENT OFFICE 2,130,113

APPARATUS FOR DELIVERING EDIBLE SOLIDS TO ICE CREAM

Harry B. Adams, Chicago, Ill., assignor to Cherry-Burrell Corporation, Chicago, Ill., a corporation of Delaware Application February 4, 1936, Serial No. 62,271

17 Claims. (Cl. 107—1)

The present invention relates to an apparatus for introducing edible solids such as fruits, nut meats, pieces of candy, etc., into a flowing stream of a plastic comestible such as semi-frozen ice cream, water ice, or sherbet, and relates more particularly to that type of apparatus in which the edible solids are delivered into a passageway for a continuously flowing stream of edible plastic material under pressure by a transfer mechanism which cyclically removes measured quantities of said solids from a source of supply and forces them into the stream.

The main objects of my invention are to provide a mechanism of the class described, which is simple, compact, and efficient; which has a minimum number of movable parts; which is easily taken apart for cleaning; which subjects the solids to a minimum amount of mechanical handling; which will not permit the outflow of the ice cream under pressure into the supply of solids; which is positive in action; which will permit the introduction of large edible solid pieces into the plastic mass with the minimum amount of mutilation, and which may be easily regulated to vary the amount introduced and to control the distribution thereof in the stream.

As an important feature of the present invention, the transfer mechanism includes a rotor having one or more pockets extending in the periphery thereof, and a passageway for the plastic material, which follows along a substantial portion of said periphery in open communication with the path of movement of the outer end of said pocket. While said pocket is moving along another part of said path, a plunger is moved inward radially to permit the filling of said pocket. While said pocket is moving along said passageway, said plunger is moved outward radially to forcibly and progressively inject said solids into the stream of plastic material. By means of this construction, the solids are not introduced into the plastic material in separate and concentrated batches but are progressively distributed lengthwise of the stream along a substantial portion thereof, thereby effecting better distribution of the solids and minimizing the compression and mutilation of the solids during the ejecting process.

By providing two pockets at diametrically opposite sides of the rotor, a single plunger may be provided operating in alternate phases in both pockets. Thus the passage for the stream may follow along approximately one-half of the periphery of the rotor. By extending the pockets and plunger transversely of the axis of the rotor, the use of a comparatively short rotor with a maximum capacity is permitted.

By making the bottom of the supply receptacle serve as the top of the chamber for the rotor, the removal of the receptacle exposes all of the operating parts and permits their ready removal and cleaning.

By making the rotor operating cam integral with and on the underside of the receptacle bottom, the number of parts and the cost are reduced.

By making the pockets and the guide for the plunger as a straight channel diametrically across the upper surface of the rotor body, the parts are rendered simple in design and inexpensive to accurately machine to proper size and fit.

My improved apparatus involves various other important features and advantages which will be pointed out hereinafter or will be apparent from a consideration of the specific form illustrated in the accompanying drawings.

In these drawings:—

Fig. 1 is a vertical section taken through one form of apparatus embodying the present invention, Figs. 2 and 3 are horizontal sections taken on the lines 2—2 and 3—3, respectively, of Fig. 1, Fig. 4 is a section taken on the line 4—4 of Fig. 3, Fig. 5 is a section taken on the line 5—5 of Fig. 2, Fig. 6 is a section taken on the line 6—6 of Fig. 3, and showing a lubricating groove for the rotor, Fig. 7 is a sectional detail on the line 7—7 of Fig. 2, Fig. 8 is a top plan view of a hopper, and showing a modified form of means for aiding in the delivery of the solids from the hopper, Fig. 9 is a section taken on the line 9—9 of Fig. 8, and Figs. 10, 11 and 12 are rather diagrammatic top plan views showing various arrangements for utilizing a battery of freezers in conjunction with a single or a plurality of injecting devices and a single mixing apparatus.

In the illustrated embodiment of my invention, there is provided a hopper or supply receptacle 10 for the solids such as nuts or fruits or particles thereof. Directly below said hopper is a conveyor and transfer or injector device 11 operated from a suitable source of power such as the geared head motor 12 controlled from a suitable switch or control box 13. The hopper 10 and the injector device 11 are shown supported on a skeleton frame 14 which in turn is supported on a cylindrical base column 15 enclosing the motor 12 and resting on a suitable portable base 16.

The hopper 10 comprises a cylindrical shell 17 and a bottom wall member 18 rigid therewith and provided with a segmental discharge opening 19 through which the solids are permitted to gravitate to the transfer and injector mechanism 11 below.

The transfer and injector mechanism 11 comprises a cylindrical rotor 20 having a close rotary fit in a stationary housing 21 which is closed at its upper end by the bottom wall 18 of the hopper 10. This rotor 20 is driven by a shaft 22 which extends coaxially with the hopper 10, and connected to the shaft 23 of the gear head motor 12 preferably by a slip coupling 24 which prevents relative rotation of these two shafts 22 and 23 while permitting their relative axial separation for cleaning purposes.

The rotor housing 21 is provided with an elongated curved recess following the periphery of the rotor 20 and closed at the top by the wall 18. This recess which serves as a passageway 25 for the ice cream, extends around approximately one-half the periphery of the rotor 20 and is provided with an inlet 26 at one end and an outlet 27 at the opposite end, both tangential to the rotor. The semi-frozen plastic material such as ice cream is delivered under pressure from any suitable source, such for instance as the continuous freezer of the general type disclosed in the Vogt Patent Nos. 1,783,864, 1,783,865, and 1,783,867, issued December 2, 1930, and flows through a conduit 29 having a three-way valve 28, into the inlet 26, through the passageway 25 and out through the outlet 27.

In order to transfer successive charges of solids from the hopper 10 to the passageway 25, the rotor body 20 is provided in its upper surface with a diametrically extending channel in which is slidably mounted a plunger 32 of the full height of the channel, so that its upper surface is flush with that of the rotor body. The plunger is shorter than the diameter of said body so as to form pockets 30, 31 at the ends during reciprocation.

For reciprocating the plunger 32, the wall member 18 is provided with a stationary cam 35 integral therewith on the underside and disposed in a central transverse channel 34 in the upper side of the plunger. This cam 35 is in the form of a circular disc disposed eccentrically of the axis of the rotor 20 and so positioned that when each pocket reaches the outlet end of the passageway 25, the plunger 32 will have reached the end of its stroke and the contents of said pocket will have been entirely ejected into said passageway.

The shuttle movement of the plunger 32 is permitted by a longitudinal slot 36 through which extends the shaft 22.

In the operation of the apparatus so far described, as the rotor 20 is rotated in a counterclockwise direction as shown in Fig. 3, the pocket 30 which has just completed its discharging phase approaches the discharge opening 19 of the hopper 10 while the pocket 31 with a charge of solids therein moves along the passageway 25. During this movement, the plunger 32 is receding from the pocket 30 and moving radially outwardly in the pocket 31 to progressively discharge its contents into the passageway 25 along the length of the latter. As the empty pocket 30 moves beneath the hopper discharge opening 19, a portion of the solids drops from the hopper 10 into said pocket. Each pocket has an alternate filling and discharging phase during each revolution of the rotor so that two injections of solids take place during each revolution of the rotor. Furthermore since the inlet and outlet of the passageway 25 are at diametrically opposite sides of the rotor 20, there is always one pocket discharging into the passageway so that there is no interruption between ejecting periods.

The rotor 20 is preferably operated at a peripheral speed which is different from the speed of flow of the ice cream in the passageway 25 so that the solids are distributed lengthwise of the moving stream. The direction of rotation of the rotor may be opposite to the direction of flow of the stream.

In order to effect a better distribution of the solids ejected in the plastic material passageway 25, the bottom 18 of the hopper 10 is provided with a series of dispersion fins 39 extending into said passageway. These do not extend to the bottom of the passageway and are set at an angle to the direction of flow so as to give a certain turbulence.

In order to regulate the amount of edible solids introduced into the pockets as they move beneath the hopper discharge opening 19, there is provided a valve plate 40 disposed in a guide groove 41 formed in the bottom of the member 18 between said member and the top of the rotor 20 and of a thickness equal to the depth of the groove. This valve plate 40 is movable endwise in the same general direction as the length of the opening 19 and may close off any portion of the arcuate length of said opening. At its outer end the plate has an upwardly extending flange 42 with a vertical slot 43. A boss 45 on the periphery of the rotor housing 21 has a fixed threaded stud 44 extending through the slot 43 and provided with a nut 46 rotatably mounted in the slot 43 and held against axial movement in the flange 42. By rotating the nut 46 on the stud 44, the valve plate 40 is moved into selective position to block the desired portion of the hopper discharge opening 19. Thus the quantity or percentage of solids injected into the ice cream can be quickly and easily controlled while the machine is running.

To prevent the jamming or bridging of the solids in the hopper and to insure the free flow of solids through the hopper discharge opening 19, there is provided an agitator blade 48 connected to the upper end of the rotor shaft 22 for rotation therewith. In order to effect an easily removable connection between the agitator blade 48 and the shaft 22, said shaft is bifurcated at its upper end to receive the center portion 49 of the blade which is retained in position by means of a clip 50 having a snap fit into a circumferential peripheral groove in the shaft.

To prevent the rotation of the solids with the agitator 48, as a unit mass in the hopper, and to insure proper action of the agitator, there is provided a fixed baffle 53 extending vertically along one side of the hopper 10 and above the hopper discharge opening 19.

To lubricate the rubbing surfaces between the rotor 20 and the rotor housing 21 there is provided a channel 54 leading from the passageway 25 downwardly along the side wall of the housing and then along the bottom wall of said housing. During operations, the channel 54 is filled with sufficient ice cream to lubricate the frictional surfaces between the rotor 20 and the housing 21 thereby avoiding the use of oil which would contaminate the ice cream being processed.

After the ice cream with the solids incorporated therein is discharged through the outlet 27, it may in some cases be desirable to effect further mixing of the solids with the ice cream. For that purpose, there may be provided an agitating or mixing chamber 55. This mixing chamber may be in the form of a cylindrical casing having a series of pins or fingers 57 projecting inwardly from the wall of the chamber and cooperating with a series of pins or fingers 58 extending transversely from a rotatable agitating shaft 59. This shaft may be rotated by the rotor 20 through a sprocket or chain drive 60, and is resiliently mounted for limited vertical movement by means of a coil spring 61 encircling the lower exposed end of the shaft. During the agitation of the ice cream the solids may be permitted to pass between the pins without mutilating or binding due to the yielding permitted by the spring.

The ice cream with the solids incorporated therein, as it flows upwardly in the mixing chamber 55, is thoroughly intermixed to effect uniform distribution of said solids throughout the ice cream. The thoroughly mixed ice cream and the solids are then discharged from the outlet 56 and may be delivered into receiving cans, containers, wrappers or the like. A can filler which may be used is disclosed in the Vogt and Wymond Patent No. 1,881,106 issued August 4, 1932.

In Figs. 8 and 9 there is shown another form of means for aiding in the discharge of solids from the hopper 10 through the discharge opening 19. In this construction there is provided a plate 62 connected to the lower end of a spindle 63 which is guided for vertical movement in a sleeve 64 connected to the side of the hopper 10. The plate 62 is segmental in shape and inclined upwardly in a direction contra to the direction of rotation of the rotor 20, and extends over the hopper discharge opening 19, so that the solids as they move in a counterclockwise direction by the action of the agitator blade 48, are guided downwardly and through the discharge opening 19 as they reach the lower side of the plate 62. It is advantageous to permit limited resilient vertical movement of the plate. For that purpose, a spring 65 encircles the spindle 63 and is held between a shoulder 66 on the sleeve 64 and a nut 67 on the spindle. A nut 68 above the shoulder 66 limits the downward movement of the spindle. In this manner, the plate 62 serves not only to guide the solids towards the discharge opening 19 but also serves to gently but yieldingly press the solids through said opening.

The bottom 18 of the hopper is secured to the rotor casing 21 by a plurality of nuts 70. It will be noted that by removing these nuts and removing the clip 50, the agitator 48 may be taken out and the hopper may be lifted off. This carries with it the cam 35 and the mixing blades 39. The plunger 32 may be lifted out of its guideway. The rotor body may then be lifted out, using the upper end of the shaft as a handle. Thus the parts may be very quickly taken apart for thorough cleaning and sterilizing and may be quickly reassembled.

The apparatus may be easily and quickly brought into or out of operation by means of the three-way valve 28. With the valve in one position the cream will be delivered through the apparatus to receive fruit, nuts or the like, and with it in the other position, the cream will be delivered through the conduit to a can filler or other packaging device. With the valve in the last mentioned position, the apparatus may be quickly taken apart, washed up, reassembled, and the hopper filled with a different kind of fruit or nuts for making a different flavor of ice cream without interrupting the flow from the continuous freezer or other source of supply. The fruit or nut feeder may be cut in or out at any time to permit making any desired gallonage of any flavor or plain ice cream.

In Fig. 10 is shown an arrangement in which an injecting apparatus is utilized to inject edible solids into a stream of plastic ice cream delivered from a single freezer, and the resultant mixture is blended and intermixed with the output of one or more other freezers. In this arrangement there is provided a battery of freezers, three of such freezers $F^1$, $F^2$ and $F^3$ being shown. These freezers may be of the continuous pressure type shown in the Vogt patents hereinbefore referred to, and one of said freezers, as for instance the freezer $F^1$, is connected to the inlet side of an injecting apparatus I of the general type hereinbefore disclosed, said inlet corresponding to the inlet 26 of the constructions of Figs. 1 to 9.

The outlet of the injecting apparatus I corresponding to the outlet 27 of the constructions of Figs. 1 to 9, and the outlets of the other two freezers $F^2$ and $F^3$ are connected in parallel to a pipe 71. Also connected to the pipe 71 is a delivery pipe 72 leading to a mixing chamber M which may be of the general type corresponding to the mixing apparatus 55 shown in Fig. 1. The outlet of the mixing chamber M leads to a suitable device 73 which may be used for filling cans, packages, tubes, wrappers or the like, or forming extruded bars, rods or bricks.

In Fig. 11 is shown an arrangement in which each freezer is associated with a corresponding injecting apparatus and in which the outputs of two or more of such combinations are intermixed in a single mixing apparatus. In this arrangement, the outlets of the freezers $F^1$, $F^2$ and $F^3$ are shown connected respectively to the inlet sides of three injecting apparatus $I^1$, $I^2$ and $I^3$, the outlets of these injecting apparatus being connected in parallel to the pipe 71. The pipe 71 has a take-off pipe 72 leading to the mixing apparatus M as already disclosed with reference to the arrangement of Fig. 10.

In Fig. 12 is shown an arrangement in which the outputs of a battery of freezers are merged into a single stream which is then delivered through an injecting apparatus and a mixing chamber. In this form, the outlets of the freezers $F^1$, $F^2$ and $F^3$ are connected directly in parallel to the pipe 71. Connected to the pipe 71 is a take-off 74 connected to the inlet side of an injecting apparatus $I^4$, the outlet side being connected to the mixing chamber M through a pipe 75.

The use of the arrangements of Figs. 10, 11 and 12 depends on the capacity of the freezers, the capacity of the injecting units, and the percentage of solids desired to be distributed in the ice cream. The constructions illustrated in Figures 10, 11 and 12 are claimed in my copending application, Ser. No. 219,953, filed July 19, 1938.

Having thus described my invention, what I claim as new and desire to secure by Letters Patent is:—

1. An apparatus for delivering edible solids into ice cream, including a rotor having a pocket movable in a circular path, a passageway partially encircling said rotor and extending along the path of movement of the outer end of said pocket for continuously transporting partially frozen plastic ice cream, a supply receptacle for edible solids and having a discharge outlet registering with another portion of the path of movement of said pocket, and a plunger carried in said pocket for permitting admission of said solids from said discharge outlet and for forcing them from said pocket into said passageway as said pocket moves along said passageway.

2. An apparatus for delivering edible solids into a stream of ice cream, including a rotor having a radially facing pocket in the periphery thereof, means for delivering a charge of edible solids to said pocket while the latter is in one part of its annular path of movement, a passageway along another part of said path of movement for continuously transporting partially frozen plastic ice cream, and a plunger in said pocket operating transversely of the axis of said rotor for forcing the solids from said pocket into said ice cream as said pocket moves along said passageway.

3. An apparatus for delivering edible solids into a stream of ice cream, including a rotor, a passageway extending around a substantial portion of the circumference of said rotor for continuously transporting partially frozen plastic ice cream, a supply receptacle for said solids, and means on said rotor for transferring successive charges of said solids from said receptacle into said passageway.

4. An apparatus for delivering solid edibles into a stream of ice cream, including a rotor, a passageway following around substantially one-half the circumference of said rotor for transporting a continuous stream of partially frozen plastic ice cream, said passageway having an inlet and outlet at opposite ends thereof, and means on said rotor for receiving a charge of edible solids during one rotative phase of said rotor and for moving said charge along said passageway in contact with the ice cream therein, and for simultaneously injecting said solids progressively into said ice cream.

5. In combination, a hopper adapted to contain edible solids and having a discharge opening in the bottom thereof, a rotor disposed directly beneath said hopper with the top of said rotor in contact with the bottom of said hopper, said rotor having a radially extending pocket in the upper surface thereof extending to the periphery of said rotor and movable across said discharge opening, a passageway disposed along the path of movement of the outer or peripheral end of said pocket for transporting a continuous stream of partially frozen plastic ice cream, and a plunger in said pocket for forcing the solids from said pocket into said passageway when said pocket moves along said passageway.

6. An apparatus for delivering edible solids into ice cream, including a rotor having a pair of pockets opening axially and radially thereof and each adapted to receive a charge of edible solids from the axial side along one part of its path of movement, a passageway for continuously transporting a stream of partially frozen plastic ice cream and extending along another portion of said path of movement of the radial outer ends of said pockets, a plunger extending into both of said pockets, and means for moving said plunger back and forth as said rotor rotates.

7. An apparatus for delivering edible solids into a stream of ice cream, including a rotor having a vertical axis and a channel extending diametrically across the top, a plunger movable back and forth in said channel to vary the size of the pockets constituting the end portions of said channel, a passageway extending along a part of the path of movement of the radial outer ends of said pockets and having an inlet and an outlet for continuously transporting partially frozen plastic ice cream, and a supply receptacle above said rotor and having an outlet registering with another part of the path of movement of the upper ends of said pockets.

8. An apparatus for delivering edible solids into a stream of ice cream, including a rotor having a vertical axis and a pair of radial pockets in the upper side thereof extending to the periphery thereof, a supply receptacle for said solids and having its bottom forming a top wall engaging the upper end of said rotor, and having an opening for delivering edible solids into said pockets as they move along one part of their path of movement, a circular passageway extending along a portion of the periphery of said rotor for continuously conveying a stream of partially frozen plastic ice cream, and a plunger carried by said rotor and having its opposite ends in said pockets.

9. An apparatus for delivering edible solids into ice cream, including a rotor casing, a rotor disc therein having a channel extending diametrically across one side thereof, a supply receptacle for said solids, the bottom thereof forming the top of said casing and provided with a discharge opening registering with one part of the path of movement of the outer ends of said channel, said casing having a passageway extending along a portion of the periphery of said rotor for continuously transporting a stream of partially frozen plastic ice cream, a plunger in said channel, and a stationary cam carried by the bottom of said receptacle for reciprocating said plunger.

10. An apparatus for delivering an added ingredient to a stream of ice cream, including a rotor casing having a cylindrical chamber, an inlet opening for said ingredient in one end of said chamber adjacent to but spaced from the periphery, a curved elongated recess along the periphery of said chamber with an inlet and an outlet through the casing wall at opposite ends of said recess, a rotor fitting in said chamber, and a channel extending diametrically across one side and communicating intermittently with said ingredient opening and communicating first at one end and then at the other with said elongated recess, a member carried by said rotor in said channel, and means for reciprocating said member.

11. An apparatus for delivering edible solids into ice cream, including a disc rotor, a rotor housing having a close rotary fit with said rotor and having an inlet for said solids and a recess along one side thereof forming with a portion of the circumference of said rotor an arcuate passageway having an inlet and an outlet for continuously conveying partially frozen plastic ice cream independently of the rotation of said rotor, and means on said rotor for picking up a charge of edible solids from said first mentioned inlet during one of its rotative phases and advancing it along said passageway while simultaneously and progressively injecting said solids into said ice cream.

12. An apparatus for delivering edible solids into ice cream, including a disc rotor, a rotor housing having a close rotary fit with said rotor and having an inlet for said solids and a recess along one side thereof forming with the periphery of said rotor an arcuate passageway having an inlet and an outlet for continuously conveying partially frozen plastic ice cream and independently of the rotation of said rotor, a passage leading from said passageway along one side of said rotor to permit lubrication by a portion of the ice cream, and means on said rotor for picking up a charge of edible solids from said first mentioned inlet during one of its rotative phases and advancing it along said passageway while simultaneously and progressively injecting said solids into said ice cream.

13. An apparatus for delivering edible solids into ice cream, including a disc rotor, a rotor housing having a close rotary fit with said rotor and having an inlet for said solids and a recess along one side thereof forming with a portion of the circumference of said rotor an arcuate passageway having an inlet and an outlet for continuously conveying partially frozen plastic ice cream independently of the rotation of said rotor, a slide movable to cover said inlet for solids to a greater or lesser extent, and means on said rotor for picking up a charge of edible solids from said first mentioned inlet during one of its rotative phases and advancing it along said passageway while simultaneously and progressively injecting said solids into said ice cream.

14. An apparatus for delivering edible solids into a stream of ice cream, including a hopper adapted to contain edible solids and having a bottom wall provided with a discharge opening, a passageway for continuously transporting partially frozen plastic ice cream, a shaft extending through said bottom wall into said hopper, an agitator in said hopper connected to said shaft, a rotor connected to said shaft directly below said hopper, and means on said rotor for receiving a charge of edible solids from said opening and delivering it into said passageway.

15. An apparatus for delivering edible solids into a stream of ice cream, including a hopper adapted to contain edible solids and having a bottom wall provided with a discharge opening, a slide for controlling said opening, a passageway for continuously transporting partially frozen plastic ice cream, a shaft extending through said bottom wall into said hopper, an agitator in said hopper connected to said shaft and movable over said slide and said opening, a rotor connected to said shaft directly below said hopper, and means on said rotor for receiving a charge of edible solids from said opening and delivering it into said passageway.

16. An apparatus for delivering edible solids into a stream of ice cream, including a hopper adapted to contain edible solids and having a bottom wall provided with a discharge opening, a rotor having one end in contact with the outer side of said bottom wall, and having a pocket movable across said discharge opening to receive a charge of edibles from said hopper, a passageway extending around a portion of the circumference of said rotor in the path of movement of said pocket for continuously transporting partially frozen plastic ice cream, said hopper having a dispersion plate connected to the bottom thereof and extending into said passageway, and a plunger in said pocket for forcing edible solids into said passageway as said pocket moves into communication with said passageway.

17. In an apparatus of the class described, a supply hopper for edible solids, having a discharge opening in the bottom thereof and spaced from the axis thereof, an agitator in said hopper, an inclined plate extending over said discharge opening and having limited resilient movement whereby said plate serves to gently press the solids through said opening as they are stirred by said agitator, and a rotor below said hopper for receiving successive batches of solids from said opening.

HARRY B. ADAMS.